United States Patent
Stuntebeck

(10) Patent No.: US 10,108,808 B2
(45) Date of Patent: Oct. 23, 2018

(54) DATA ACCESS SHARING

(71) Applicant: AirWatch LLC, Atlanta, GA (US)

(72) Inventor: Erich Stuntebeck, Marietta, GA (US)

(73) Assignee: AIRWATCH LLC, Atlanta, GA (US)

( * ) Notice: Subject to any disclaimer, the term of this patent is extended or adjusted under 35 U.S.C. 154(b) by 0 days.

(21) Appl. No.: 14/992,782

(22) Filed: Jan. 11, 2016

(65) Prior Publication Data

US 2016/0125192 A1    May 5, 2016

Related U.S. Application Data

(63) Continuation of application No. 13/838,935, filed on Mar. 15, 2013, now Pat. No. 9,275,245.

(51) Int. Cl.
    *G06F 7/04*     (2006.01)
    *G06F 21/62*    (2013.01)

(52) U.S. Cl.
    CPC ................... *G06F 21/62* (2013.01)

(58) Field of Classification Search
    CPC ............... G06F 21/62; G06F 21/53
    USPC ......................................................... 726/28
    See application file for complete search history.

(56) References Cited

U.S. PATENT DOCUMENTS

| | | | |
|---|---|---|---|
| 5,574,786 A | 11/1996 | Dayan et al. | |
| 5,987,609 A | 11/1999 | Hasebe | |
| 6,021,492 A | 2/2000 | May | |
| 6,023,708 A | 2/2000 | Mendez et al. | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,233,341 B1 | 5/2001 | Riggins | |
| 6,560,772 B1 | 5/2003 | Slinger | |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 | 6/2004 | Riggins | |
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasin | |
| 7,039,394 B2 | 5/2006 | Bhaskaran | |
| 7,039,679 B2 | 5/2006 | Mendez et al. | |
| 7,064,688 B2 | 6/2006 | Collins et al. | |

(Continued)

OTHER PUBLICATIONS

Niederer et al, Agent-Based Meeting Scheduling Support Using Mobile Clients, 2009, IEEE, pp. 719-724.*

(Continued)

*Primary Examiner* — Luu Pham
*Assistant Examiner* — Jenise Jackson
(74) *Attorney, Agent, or Firm* — Clayton, McKay & Bailey, PC

(57) ABSTRACT

Data access sharing may be provided. Requests may be received to display an data item associated with a list of data items. Upon determining whether a property of the data item is restricted by an access control policy, the property may be modified prior to rendering a display of the data item.

11 Claims, 5 Drawing Sheets

(56) References Cited

U.S. PATENT DOCUMENTS

| | | |
|---|---|---|
| 7,092,943 B2 | 8/2006 | Roese et al. |
| 7,184,801 B2 | 2/2007 | Farcasia |
| 7,191,058 B2 | 3/2007 | Laird et al. |
| 7,203,959 B2 | 4/2007 | Nachenberg |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,122 B1 | 6/2010 | Johnson |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman |
| 8,046,823 B1 | 10/2011 | Begen |
| 8,060,074 B2 | 11/2011 | Danford |
| 8,069,144 B2 | 11/2011 | Quinlan |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,225,381 B2 | 7/2012 | Lemke |
| 8,572,495 B2 | 10/2013 | Stillion et al. |
| 8,690,062 B1 | 4/2014 | Qureshi |
| 8,904,550 B2* | 12/2014 | Bukurak .............. G06F 21/53 726/27 |
| 2002/0013721 A1 | 1/2002 | Dabbiere et al. |
| 2003/0061087 A1 | 3/2003 | Srimuang |
| 2003/0110084 A1 | 6/2003 | Eberhard |
| 2003/0200304 A1 | 10/2003 | Thorpe et al. |
| 2003/0204716 A1 | 10/2003 | Rockwood |
| 2004/0123153 A1 | 6/2004 | Wright |
| 2004/0181687 A1 | 9/2004 | Nachenberg |
| 2004/0224703 A1 | 11/2004 | Takaki |
| 2005/0246192 A1 | 11/2005 | Jauffred et al. |
| 2006/0190984 A1 | 8/2006 | Heard |
| 2007/0033397 A1 | 2/2007 | Phillips |
| 2007/0174433 A1 | 3/2007 | Mendez |
| 2007/0136492 A1 | 6/2007 | Blum |
| 2007/0156897 A1 | 7/2007 | Lim |
| 2007/0261099 A1 | 11/2007 | Broussard et al. |
| 2007/0288637 A1 | 12/2007 | Layton |
| 2008/0015922 A1* | 1/2008 | Nelken ............... G06Q 10/109 705/7.19 |
| 2008/0027955 A1* | 1/2008 | May .................. G06Q 10/109 |
| 2008/0133712 A1 | 1/2008 | Friedman |
| 2008/0134305 A1 | 6/2008 | Hinton |
| 2008/0134347 A1 | 6/2008 | Goyal et al. |
| 2008/0195619 A1 | 8/2008 | Jain et al. |
| 2008/0195627 A1* | 8/2008 | Bredin ............ G06F 17/30575 |
| 2008/0201453 A1 | 8/2008 | Assenmacher |
| 2009/0029676 A1* | 1/2009 | Thalapaneni ..... H04L 29/12047 455/411 |
| 2009/0036111 A1 | 2/2009 | Danford |
| 2009/0112986 A1 | 4/2009 | Caceres |
| 2009/0144632 A1 | 6/2009 | Mendez |
| 2009/0307362 A1 | 6/2009 | Mendez |
| 2009/0198997 A1 | 8/2009 | Yeap |
| 2009/0228322 A1 | 9/2009 | Van Os et al. |
| 2009/0248480 A1* | 10/2009 | Miksovsky ........ G06Q 10/1095 705/7.19 |
| 2009/0260064 A1 | 10/2009 | McDowell |
| 2009/0300739 A1 | 12/2009 | Nice |
| 2009/0307212 A1* | 12/2009 | Ramot ............... G06Q 10/109 |
| 2010/0005125 A1 | 1/2010 | Mendez |
| 2010/0005157 A1 | 1/2010 | Mendez |
| 2010/0005195 A1 | 1/2010 | Mendez |
| 2010/0010864 A1* | 1/2010 | Lee .................. G06Q 10/1093 705/7.18 |
| 2010/0023630 A1 | 1/2010 | Mendez |
| 2010/0100641 A1 | 4/2010 | Quinlan |
| 2010/0120450 A1 | 5/2010 | Herz |
| 2010/0146269 A1 | 6/2010 | Baskaran |
| 2010/0190474 A1 | 7/2010 | Rajguru |
| 2010/0254410 A1 | 10/2010 | Collins |
| 2010/0273456 A1 | 10/2010 | Wolovitz |
| 2010/0299152 A1 | 11/2010 | Batchu |
| 2010/0299362 A1 | 11/2010 | Osmond |
| 2010/0299376 A1 | 11/2010 | Batchu |
| 2010/0299719 A1 | 11/2010 | Burks |
| 2010/0306824 A1* | 12/2010 | Gurney ............... G06F 21/6245 726/4 |
| 2010/0306827 A1 | 12/2010 | Esteve Balducci et al. |
| 2011/0004941 A1 | 1/2011 | Mendez |
| 2011/0153799 A1 | 3/2011 | Mendez |
| 2011/0082900 A1 | 4/2011 | Nagpal |
| 2011/0113062 A1 | 5/2011 | Quinlan |
| 2011/0225252 A1 | 5/2011 | Bhat |
| 2011/0137992 A1* | 6/2011 | Michel ............... G06Q 10/109 709/204 |
| 2011/0145932 A1 | 6/2011 | Nerger |
| 2011/0153779 A1 | 6/2011 | Mendez et al. |
| 2011/0167474 A1 | 7/2011 | Sinha |
| 2011/0270799 A1 | 7/2011 | Muratov |
| 2011/0202589 A1 | 8/2011 | Piernot |
| 2011/0320552 A1 | 9/2011 | Friedman |
| 2011/0276805 A1 | 11/2011 | Nagpal |
| 2011/0296186 A1 | 12/2011 | Wong |
| 2011/0314383 A1* | 12/2011 | Abdo ................. G06F 21/6227 715/738 |
| 2011/0317523 A1* | 12/2011 | Lance ................. G06Q 10/109 368/10 |
| 2012/0005578 A1 | 1/2012 | Hawkins |
| 2012/0015644 A1 | 1/2012 | Danford |
| 2012/0102392 A1 | 4/2012 | Reesman |
| 2012/0198547 A1 | 8/2012 | Fredette |
| 2012/0311131 A1 | 12/2012 | Arrasvuori |
| 2013/0036369 A1 | 2/2013 | Mitchell et al. |
| 2013/0061288 A1* | 3/2013 | Paim .................. G06Q 10/06 726/4 |
| 2013/0061307 A1 | 3/2013 | Livne |
| 2013/0097496 A1 | 4/2013 | Lu |
| 2013/0152169 A1 | 6/2013 | Stuntebeck |
| 2013/0204964 A1* | 8/2013 | Los .................. G06Q 10/1093 709/217 |
| 2013/0217350 A1 | 8/2013 | Singh |

(56) References Cited

U.S. PATENT DOCUMENTS

| | | | |
|---|---|---|---|
| 2013/0238708 A1 | 9/2013 | Bustamente | |
| 2013/0246373 A1 | 9/2013 | Hansma | |
| 2013/0275172 A1 | 10/2013 | Barnett et al. | |
| 2013/0305160 A1 | 11/2013 | Gingras et al. | |
| 2014/0019876 A1* | 1/2014 | Sun | G06Q 10/00 715/753 |
| 2014/0045449 A1* | 2/2014 | Cook | H04M 1/72577 455/404.1 |
| 2014/0059487 A1* | 2/2014 | Baumann | G06F 3/0482 715/811 |
| 2014/0082089 A1* | 3/2014 | Liew | H04L 65/403 709/204 |
| 2014/0149886 A1 | 5/2014 | Los | |
| 2014/0156597 A1 | 6/2014 | Hakami et al. | |
| 2014/0229220 A1* | 8/2014 | Yuen | A61B 5/0002 705/7.19 |
| 2014/0229610 A1 | 8/2014 | Shen et al. | |
| 2014/0289743 A1 | 9/2014 | Degirmenci | |
| 2015/0199510 A1 | 7/2015 | Krstic | |
| 2015/0324756 A1* | 11/2015 | Hughes | G06Q 10/10 705/7.19 |
| 2016/0011765 A1* | 1/2016 | Abdo | G06F 21/6227 715/741 |
| 2017/0221094 A1* | 8/2017 | Price | G06Q 30/0244 |

OTHER PUBLICATIONS

Ching et al, Simple Authentication Scheme for Personal Digital Assistants Using the Hidden Markov Model Toolkit, 2007, IEEE, pp. 215-218.*

Mynatt et al, Inferring Calendar Event Attendance, 2001, ACM, pp. 121-128.*

\* cited by examiner

400

|  | Monday | Tuesday | Wednesday | Thursday | Friday |
|---|---|---|---|---|---|
| 9am<br>10am<br>11am<br>12pm<br>1pm<br>2pm<br>3pm<br>4pm<br>5pm<br>6pm | Doctor<br>402 |  | John's<br>Birthday<br>404 |  |  |

|  | Monday | Tuesday | Wednesday | Thursday | Friday |
|---|---|---|---|---|---|
| 9am<br>10am<br>11am<br>12pm<br>1pm<br>2pm<br>3pm<br>4pm<br>5pm<br>6pm |  | 412<br>Product<br>Meeting | 414<br>Conference<br>with NY<br>Group | 416 | Vacation |

Figure 4B

|  | Monday | Tuesday | Wednesday | Thursday | Friday |
|---|---|---|---|---|---|
| 9am |  |  | John's Birthday |  |  |
| 10am |  |  |  |  |  |
| 11am | Doctor | Busy |  |  |  |
| 12pm |  |  |  |  | Vacation |
| 1pm |  |  |  |  |  |
| 2pm |  |  | Busy |  |  |
| 3pm |  |  |  |  |  |
| 4pm |  |  |  |  |  |
| 5pm |  |  |  |  |  |
| 6pm |  |  |  |  |  |

420 ← Wednesday column; 402 → Monday Doctor; 404 → John's Birthday; 416 → Thursday; 422(A) → Tuesday Busy; 422(B) → Wednesday Busy

Figure 4C

|  | Monday | Tuesday | Wednesday | Thursday | Friday |
|---|---|---|---|---|---|
| 9am |  |  | John's Birthday |  |  |
| 10am |  |  |  |  |  |
| 11am | Busy | Product Meeting |  |  |  |
| 12pm |  |  |  |  | Vacation |
| 1pm |  |  |  |  |  |
| 2pm |  |  | Conference with NY Group |  |  |
| 3pm |  |  |  |  |  |
| 4pm |  |  |  |  |  |
| 5pm |  |  |  |  |  |
| 6pm |  |  |  |  |  |

430; 412 → Product Meeting; 404 → John's Birthday; 416 → Thursday; 432 → Busy; 414 → Conference with NY Group

Figure 4D

DATA ACCESS SHARING

This application is a continuation of U.S. application Ser. No. 13/838,935, filed Mar. 15, 2013, the contents of which are hereby expressly incorporated by reference in its entirety.

BACKGROUND

Data access sharing provides configurable permissions to share items between data sets associated with the same entity. In some situations, a single entity, such as a work team or an individual user, may want to share event items between the data sets of different calendars. For example, a user may have a personal calendar with private appointments, birthdays, vacation details, etc. as well as a work calendar with meetings, office holidays, and deadlines. Conventional approaches generally require the user to manually copy items from one calendar to the other or use a synchronization application that simply duplicates all items from one calendar to the other. This creates security and privacy problems, as the user may not wish for a personal appointment, such as a doctor's visit, to be visible on their work calendars. Similarly, a business may not want details of their employees confidential meetings visible on a personal calendar that may then be shared with non-employees of the business.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Data access sharing may be provided. Requests may be received to display an data item associated with a list of data items. Upon determining whether a property of the data item is restricted by an access control policy, the property may be modified prior to rendering a display of the data item.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings:

FIGS. 4A-4D are illustrations of a user interface.

DETAILED DESCRIPTION

Figure 1:
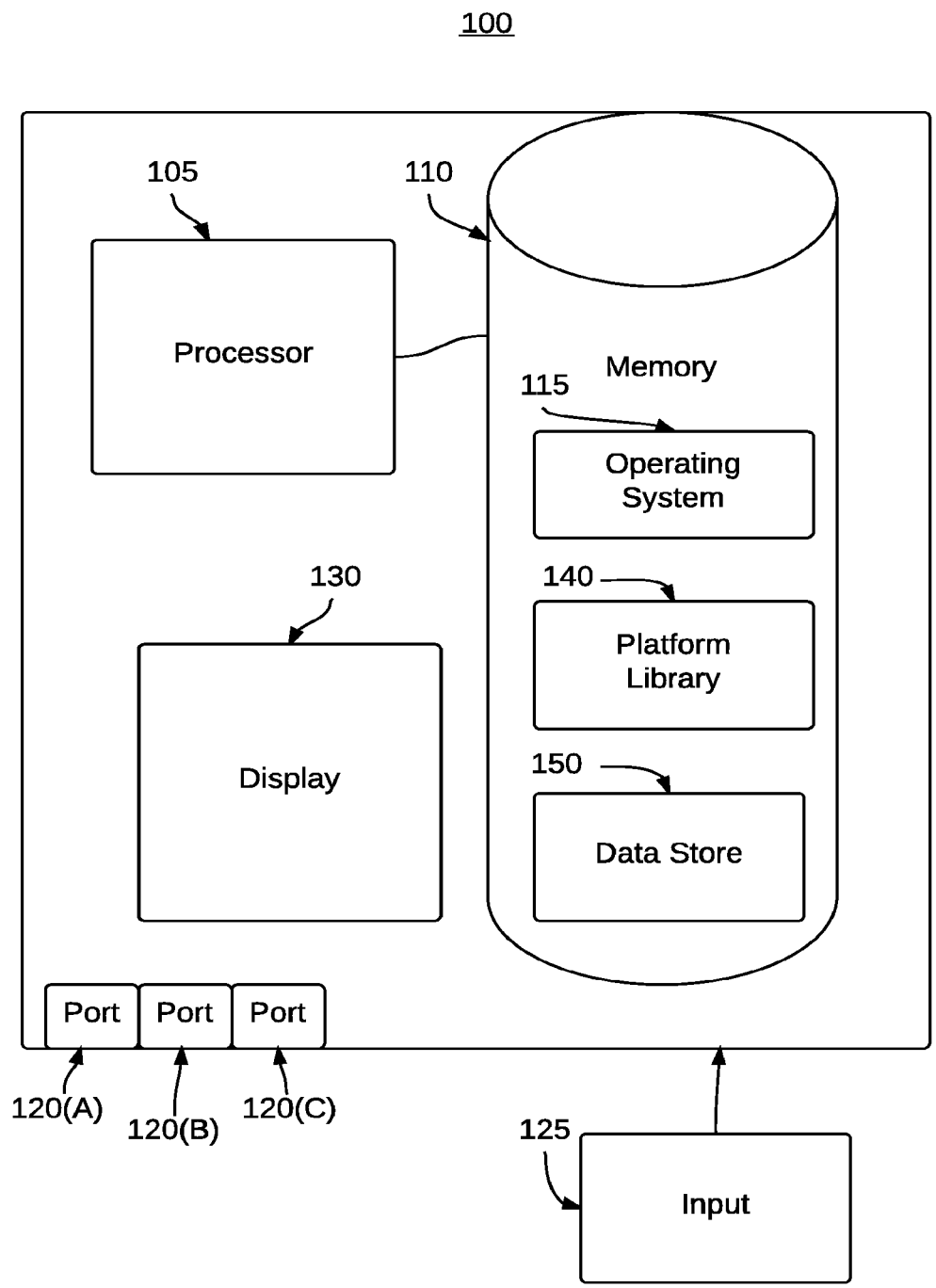
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Shared data access may be provided. Often, a person may use multiple devices and/or applications to keep track of data such as contact lists, calendars, to-do items, document files, email/SMS messages, and the like. For example, they may have an enterprise calendar associated with their work that may be stored and managed on their company's servers as well as a personal calendar, such as may be offered with their personal email or Internet Service Provider (ISP). In some situations, multiple users may be part of a group, such as a team within the company, that may have a shared data sets for tracking project progress, deadlines, status meetings, etc.

Using a calendar application as a non-limiting example, a user's enterprise calendar may be encrypted to protect confidential data, such as contact names, meeting subjects, agendas, etc. In some cases, however, at least some of the enterprise calendar data may need to be shared to the personal calendar, such as for the user's convenience in viewing a single calendar application with all of their event data. The enterprise calendar data may be analyzed to identify those properties that may not need to be kept confidential and may be shared, such as the existence of an event, its start/end time, and/or a status (e.g., free, busy, out of office, tentatively busy, etc.) associated with the event. The non-confidential data may then be published so that a single calendar view can display a user's personal events and at least some information associated with the enterprise events. In some embodiments publication and/or propagation of the data may comprise exporting the data to an external location, such as a web-server, to another application, and/or copying the data to another memory location in a device.

In some embodiments, a user may not want their personal calendar data shared with other employees of their company or enterprise and/or the enterprise may wish to protect the user's privacy by restricting the enterprise's access to the personal data. The user may still desire to let those other employees know their availability, however. Similar non-confidential information from the user's personal calendar may be collected and published so that the user's enterprise calendar can reflect the limited, non-confidential information.

Publication of the non-confidential information from one calendar to another may be accomplished in several ways. In some embodiments, one calendar application may subscribe to a service that receives and publishes the non-confidential information from another calendar. Such a subscription may require authentication for a given entity (e.g., another user, an enterprise server, and/or an application) to access even the non-confidential information, such as where a user may provide a Personal Identification Number (PIN), password, or similar token to allow only those other entities the user has approved to access the event information.

In some embodiments, two calendar data sets may be maintained on a single device, with one data set contained within a "sandbox" environment that is generally unaccessible to applications and/or hardware components that are not authorized to operate within the sandbox. For example, all enterprise data may be required to be encrypted unless opened in a sandboxed application that does not allow the export of data within that application. The calendar data within the sandbox may be analyzed and a subset of the data that does not contain confidential data may be published to a shared storage area of the device.

In some embodiments, event data may be shared between enterprise calendars of two users associated with the enterprise. For example, a single calendar view may display status information for several members of a team without displaying confidential and/or personal/private information associated with the underlying events.

FIG. 1 is a block diagram of a user device 100 comprising a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination thereof. Memory 110 may store executable programs and related data components of various applications and modules for execution by user device 100. Memory 110 may be coupled to processor 105 for storing configuration data and operational parameters, such as commands that are recognized by processor 105. User device 100 may comprise, for example, a desktop computer, a laptop computer, a personal digital assistant, a cellular telephone, a set-top box, a music player, a web pad, a tablet computer system, a game console, and/or another device with like capability.

Basic functionality of user device 100 may be provided by an operating system 115 contained in memory 100. Various programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

User device 100 may store device and/or user-specific information in a data store 150, such as a device profile and/or a plurality of user preferences. A device profile may comprise an indication of the current position of user device 100 and/or indications of the hardware, software, and security attributes which describe user device 100. For instance, the device profile may represent hardware specifications of user device 100, version and configuration information of various software program and hardware components installed on user device 100, data transmission protocols enabled on user device 100, version and usage information of various resources stored on user device 100, and/or any other attributes associated with the state of user device 100. The device profile may further comprise data indicating a date of last virus scan of user device 100, a date of last access by an IT representative, a date of last service by the IT representative, and/or any other data indicating maintenance and usage of user device 100. Furthermore, the device profile may comprise indications of the past behavior of associated users, such as resources accessed, charges for resource accesses, and the inventory accessed from such resources. The user preferences may comprise a listing of factors that may affect the experience of the user. In particular, the user preferences may include indications of the user's age, gender, bodily traits, preferred resource types, preferred venue resources, and combinations thereof.

Figure 2:
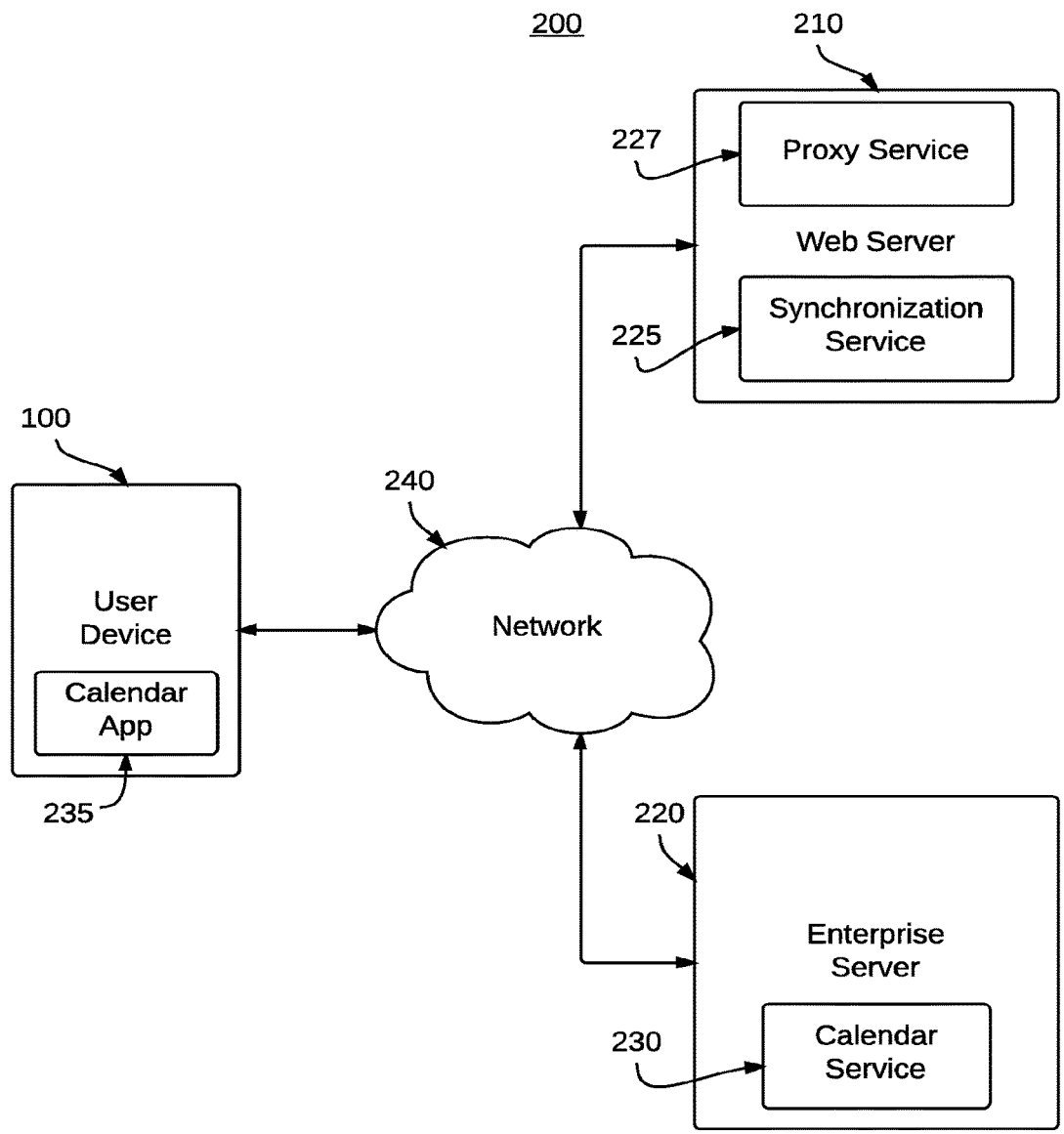
FIG. 2 is a block diagram of an operating environment.

FIG. 2 is a block diagram view of an operating environment 200 comprising user device 100 coupled to a web server 210 and an enterprise server 220 via a network 230. The web server 210 and enterprise server 220 may comprise, for example, server computers or any other system providing distribution capability. For purposes of convenience, the web server 210 and enterprise server 220 are referred to herein in the singular, although it is understood that a plurality of servers may be employed in the arrangements as descried herein. Furthermore, in some embodiments, web server 210 and enterprise server 220 may operate on the same server computer.

The components executed on the web server 210 and/or the enterprise server 220, for example, may comprise a synchronization service 225 and a calendar service 230 as well as other applications, services, processes, systems, engines, or functionality not disclosed in detail herein. The synchronization service 225 may be executed to publish calendar information from calendar service 230 and/or receive information from a calendar app 235 executing on user device 100. The synchronization service 225 may also be operable to manage subscription requests for calendar information associated with calendar service 230 and/or calendar app 235. In some embodiments, the web server 210 may execute a proxy service 227 between user device 100 and enterprise server 220. As used herein, the term "proxy service" is meant to generally refer to computer-executable instructions for authenticating user access credentials and device identifiers. The proxy service 227 may execute to receive an access request from the user device 110 for accessing enterprise resources such as the calendar service 230 and to determine whether to grant or deny the access request. Upon determining to grant the access request, the proxy service 227 may then associate the user device 100 with necessary enterprise access credentials to access the enterprise resources. The web server 210 and enterprise server 220 may include other applications, services, processes, systems, engines, or functionality not discussed in detail herein.

The network 230 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the network 110 may be or include the Internet, intranets, extranets, microwave networks, satellite communications, cellular systems, PCS, infrared communications, global area networks, or other suitable networks, etc., or any combination of such networks.

Figure 3:
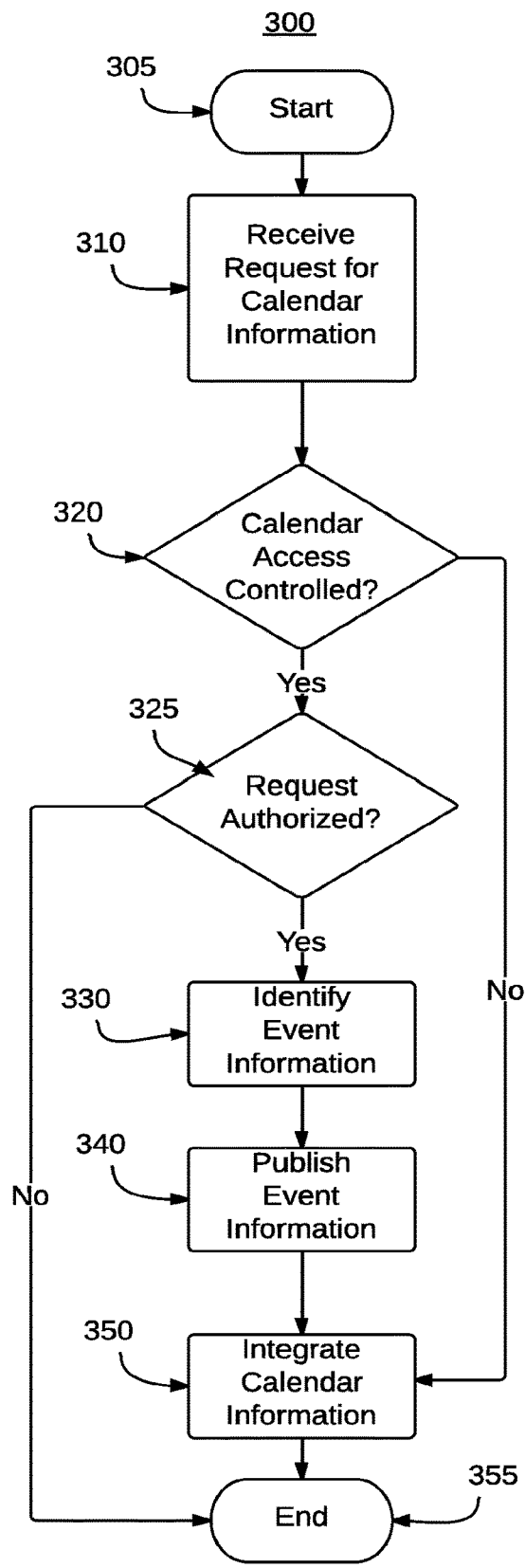
FIG. 3 is a flow chart illustrating a method for accessing shared data.

FIG. 3 is a flow chart setting forth the general stages involved in a method 300 consistent with embodiments of this disclosure for providing data access sharing. Ways to implement the stages of method 300 will be described in greater detail below. For purposes of illustration, not limitation, method 300 is described with respect to user device 100 in communication with web server 210. Method 300 may begin at starting block 305 and proceed to stage 310 where web server 210 may receive a request for a list of data items. For example, calendar app 235 may be executed on user device 100 and may request a plurality of calendar information that may be saved in data store 150 and/or may be provided by calendar service 230 via synchronization service 225.

From stage 310, method 300 may advance to stage 320 where web server 210 may determine whether access to the requested data items is controlled. For example, an access control policy associated with calendar service 230 may require authentication before providing calendar data to web server 210 and/or user device 100. Access control policies may include device, user, location, and or time/date restrictions that must be satisfied before access is permitted. For another example, calendar app 235 may execute in a controlled environment that may need to decrypt stored information before display. In some embodiments, calendar information in data store 150 may comprise personal event information associated with a user of user device 100 and calendar information provided by calendar service 230 may comprise enterprise event information. The enterprise event information may be associated with a user of user device 100, people other than the user of user device 100 (e.g., co-workers), and/or may be associated with non-person entities, such as a company, a product, or a working group.

If the access to the requested calendar data is controlled, method 300 may advance to stage 325 where web server 210 may determine whether the request is authorized. For example, user device 100 may submit user and/or device credentials to an authentication subroutine of calendar app 235 and/or may perform an authentication with web server 210 and/or enterprise server 220. Furthermore, the device characteristics of the user device 100 may be evaluated for compliance with a plurality of compliance rules. For example, a compliance service, that may be executed on any of the elements of operating environment 200, may identify the device characteristics from the device profile and compare them to a listing of hardware restrictions, software restrictions, and/or mobile device management restrictions that need to be satisfied by the user device 100.

The user credentials may uniquely identify the user of the user device 100. For example, the user credentials may include a username, a password, a token, and/or biometric data related to facial recognition, retina recognition, fingerprint recognition, and the like. User credentials may be input by a user via any suitable client side application and may be stored in the data store 150 of the user device 100. Accordingly, user credentials may be retrieved from the data store 150 and/or may be input by a user in connection with a request for access to the calendar data. Device credentials may also be used to authenticate the request for information, separately and/or in combination with the user credentials. For example, the device credentials may comprise a unique identifier and/or a device profile comprising data such as a date of last virus scan, a date of last access by IT, a date of last tune-up by IT, and/or any other data indicating a date of last device check. If the request is determined not to be authorized, method 300 may end at stage 355.

If the request is determined to be authorized at stage 325, method 300 may advance to stage 330, where web server 210 may identify data information that may be accessed. For example, the authorization of user device 100 may prohibit the display of details associated with the requested calendar information. In such a case, synchronization service 225 and/or calendar service 230 may examine each event in the enterprise calendar information and remove or modify any private, confidential and/or restricted properties. In some embodiments, the requested calendar information may be used to generate a new set of calendar information comprising a limited subset of properties of the events in the requested calendar information, such as start and end times, dates, and/or statuses such as free, busy, out-of-office, tentatively busy, etc. For another example, synchronization service 225 may determine that none of an enterprise contact list may be propagated outside of the enterprise environment, regardless of a user's authorization.

After identifying the data information at stage 330, method 300 may advance to stage 340 where web server 210 may publish the identified data information. For example, synchronization service 225 may create a data file of the limited subset of event properties that may be accessed by user device 100. For another example, web server 210 may allow the publication of a list of messages (e.g., e-mail, voicemail, and/or SMS messages) received and who they are from, without permitting access to the content of those messages.

Method 300 may then advance to stage 350 where user device 100 may integrate the requested calendar information. For example, calendar app 235 may integrate personal calendar data with the published event information into a single view. Examples of such a view are described below with respect to FIGS. 4A-4D. Method 300 may then end at stage 355.

FIG. 4A illustrates a first user interface 400 displaying a plurality of personal calendar events. For example, a doctor's appointment event 402 and a birthday event 404 may be displayed on first user interface 400.

FIG. 4B illustrates a second user interface 410 displaying a plurality of enterprise calendar events. For example, a product meeting event 412, a teleconference event 414, and a vacation event 416 may be displayed on second user interface 410.

FIG. 4C illustrates a third user interface 420 displaying the plurality of personal calendar events 402, 404 integrated with a limited subset of information from the plurality of enterprise calendar events 412, 414, 416. For example, enterprise events 412 and 414 are displayed as events 422(A)-(B) showing that the user is busy without displaying any further details of the events. Vacation event 416 may be recognized as comprising non-restricted information, and so may be displayed with all of its respective properties.

FIG. 4D illustrates a fourth user interface 430 displaying the plurality of enterprise calendar events 412, 414, and 416 integrated with a limited subset of information from the plurality of personal calendar events 402, 404. Such a view may be available, for example, on an enterprise view of a user's calendar. In fourth user interface 430, enterprise events 412, 414, and 416 are displayed with their full information while personal event 402 is redacted to show a busy event 432. Birthday event 404 may be recognized and/or explicitly marked in a property as a public event, and so its full properties may be displayed.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A computer-implemented method for controlling data security when sharing content between personal and electronic corporate calendars, comprising:
   obtaining, using a synchronization service executing on a server, a first calendar event originating from a personal electronic calendar of a first user, the first calendar event including first event details;
   displaying the first calendar event and the first event details in a first electronic corporate calendar of the first user, the first electronic corporate calendar executing within a sandboxed environment that restricts export of data to applications executing outside the sandboxed environment;
   obtaining, using the synchronization service executing on the server, a second calendar event originating from the first electronic corporate calendar of the first user, the second calendar event including second event details;
   displaying the first calendar event on a second electronic corporate calendar for a second user without displaying the first event details;
   displaying the second calendar event on the second electronic corporate calendar for the second user;
   obtaining, using the synchronization service executing on the server, a third calendar event from the first electronic corporate calendar of the first user, the third calendar event comprising third event details;

providing the third calendar event to the personal electronic calendar of the first user without the third event details, wherein the third event details are omitted automatically by the server based on the third calendar event being provided from a corporate calendar to a personal electronic calendar, without requiring an initial input or selection from the first user and without the first user having to manually remove the third event details;
displaying the third calendar event on the personal electronic calendar of the first user without the third event details; and
restricting transmission of the first calendar event displayed on the second electronic corporate calendar for a second user from the second electronic corporate calendar to a second personal electronic calendar of the second user.

2. The computer-implemented method of claim 1, wherein displaying the first calendar event on the second electronic corporate calendar for the second user comprises displaying a pre-defined description of the first calendar event, without the event details.

3. The computer-implemented method of claim 1, further comprising, prior to displaying the first calendar event on the second electronic corporate calendar for the second user:
granting, by a proxy service, an access request for the first calendar event.

4. The computer-implemented method of claim 1, wherein displaying the second calendar event on the second electronic corporate calendar for the second user comprises displaying the second calendar event with the second event details.

5. A computer-readable storage device comprising instructions which, when executed by one or more processors, control data security when sharing content between personal and electronic corporate calendars, wherein the instructions are configured to:
obtain, using a synchronization service executing on a server, a first calendar event originating from a personal electronic calendar of a first user, the first calendar event including first event details;
display the first calendar event without the first event details in a first electronic corporate calendar of the first user, the first electronic corporate calendar executing within a sandboxed environment that restricts export of data to applications executing outside the sandboxed environment;
obtain, using the synchronization service executing on the server, a second calendar event originating from the first electronic corporate calendar of the first user, the second calendar event including second event details;
display the first calendar event on a second electronic corporate calendar for a second user without displaying the first event details;
display the second calendar event on the second electronic corporate calendar for the second user;
obtain, using the synchronization service executing on the server, a third calendar event from the first electronic corporate calendar of the first user, the third calendar event comprising third event details;
provide the third calendar event to the personal electronic calendar of the first user without the third event details, wherein the third event details are omitted automatically by the server based on the third calendar event being provided from a corporate calendar to a personal electronic calendar, without requiring an initial input or selection from the first user and without the first user having to manually remove the third event details;
display the third calendar event on the personal electronic calendar of the first user without the third event details; and
restrict transmission of the first calendar event displayed on the second electronic corporate calendar for a second user from the second electronic corporate calendar to a second personal electronic calendar of the second user.

6. The computer-readable storage device of claim 5, wherein displaying the first calendar event on the second electronic corporate calendar for the second user comprises displaying a pre-defined description of the first calendar event, without the event details.

7. The computer-readable storage device of claim 5, wherein, prior to displaying the first calendar event on the second electronic corporate calendar for the second user, the instructions, when executed:
grant, by a proxy service, an access request for the first calendar event.

8. The computer-readable storage device of claim 5, wherein displaying the second calendar event on the second electronic corporate calendar for the second user comprises displaying the second calendar event with the second event details.

9. A system for controlling data security when sharing content between personal and electronic corporate calendars, comprising:
a server executing a synchronization service;
a first user device executing a personal electronic calendar of a first user and a first electronic corporate calendar of the first user; and
a second user device executing a second corporate calendar for the second user, wherein the synchronization service is configured to:
obtain a first calendar event originating from the personal electronic calendar of the first user, the first calendar event including first event details, the first electronic corporate calendar executing within a sandboxed environment that restricts export of data to applications executing outside the sandboxed environment;
provide the first calendar event to the first electronic corporate calendar of the first user;
obtain a second calendar event originating from the first electronic corporate calendar of the first user, the second calendar event including second event details;
provide the first calendar event to the second electronic corporate calendar for a second user without the first event details;
provide the second calendar event to the second electronic corporate calendar for the second user;
obtain a third calendar event from the first electronic corporate calendar of the first user, the third calendar event comprising third event details;
provide the third calendar event to the personal electronic calendar of the first user without the third event details, wherein the third event details are omitted automatically by the server based on the third calendar event being provided from a corporate calendar to a personal electronic calendar, without requiring an initial input or selection from the first user and without the first user having to manually remove the third event details; and
restrict transmission of the first calendar event displayed on the second electronic corporate calendar for a second user from the electronic corporate calendar to a second personal electronic calendar of the second user.

10. The system of claim 9, wherein displaying the first calendar event on the second electronic corporate calendar for the second user comprises displaying a pre-defined description of the first calendar event, without the event details.

11. The system of claim 9, wherein, prior to displaying the first calendar event on the second electronic corporate calendar for the second user, the system is further configured to grant, by a proxy service, an access request by confirming that the second user has permission to access the first calendar event.

* * * * *